United States Patent [19]

MacFarland et al.

[11] 4,437,710

[45] Mar. 20, 1984

[54] INFLATABLE, INERT GAS-PURGED, WELDING CHAMBER

[75] Inventors: James M. MacFarland, Frederica; Bernard W. Kappe, Camden, both of Del.

[73] Assignee: The United States of America as represented by the Secretary of the Air Force, Washington, D.C.

[21] Appl. No.: 264,930

[22] Filed: May 18, 1981

[51] Int. Cl.³ .................... B23K 20/00; B23K 35/38; A62B 15/00
[52] U.S. Cl. .......................... 312/1; 312/31; 312/31.1; 312/31.2; 312/31.3; 228/193; 219/74
[58] Field of Search ................ 312/1, 31, 31.1, 31.2, 312/31.3; 219/74; 228/193

[56] References Cited

U.S. PATENT DOCUMENTS

| | | | |
|---|---|---|---|
| 1,977,386 | 10/1934 | Holes | 312/1 |
| 2,459,812 | 1/1949 | Griffiths | 312/1 |
| 2,786,740 | 3/1957 | Taylor et al. | 312/1 |
| 2,788,430 | 7/1955 | Oakley | 219/74 |
| 3,051,164 | 8/1962 | Trexler | 312/1 |
| 3,267,830 | 8/1966 | Van Gaasbeek | 312/1 |
| 3,355,230 | 11/1967 | Trexler | 312/1 |
| 3,583,779 | 6/1971 | Olson | 312/1 |
| 3,907,389 | 9/1975 | Cox et al. | 312/1 |
| 4,088,258 | 5/1978 | Regalbuto | 228/193 |
| 4,089,571 | 5/1978 | Landy | 312/1 |
| 4,111,753 | 9/1978 | Folsom et al. | 312/1 |

FOREIGN PATENT DOCUMENTS

| | | | |
|---|---|---|---|
| 2112505 | 10/1971 | Fed. Rep. of Germany | 312/1 |
| 3004066 | 2/1980 | Fed. Rep. of Germany | 312/1 |
| 603425 | 4/1978 | U.S.S.R. | 312/1 |

Primary Examiner—Victor N. Sakran
Attorney, Agent, or Firm—Donald J. Singer; Frank J. Lamattina

[57] ABSTRACT

An inflatable, inert-gas purged welding chamber assembly ideally suited for use in welding workpieces made of a metal (e.g., titanium), or of an alloy, which is susceptible to atmospheric contamination during welding. The welding chamber of the assembly is defined by a collapsible, reusable, inflatable member (e.g., a polyethylene bag) that is releasably connected to a closeable opening in a wall member. The inflatable member, while in a collapsed condition and while containing the workpieces to be welded and the accessories therefor (e.g., a welding torch, extra tungsten electrodes, and filler wires) on a shelf protruding from the wall member, is purged of air (i.e., the ambient atmosphere) by the use of an inert gas (e.g., argon), thereby inflating the collapsed member and creating an inert gas environment in which the air-contaminable workpieces can be welded without fear of contamination. The enormous time consumed, the inert gas wasted, and the high cost of the rigid welding chambers, and of the shielding fixtures, that necessarily were used in the prior art to accomplish welding in an inert gas environment are eliminated by the use of this collapsible, reusable, inexpensive, and inflatable welding chamber.

6 Claims, 4 Drawing Figures

INFLATABLE, INERT GAS-PURGED, WELDING CHAMBER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to welding and more particularly to welding in an inert gas environment.

As the need for lighter and/or stronger materials has increased, particularly with regard to aerospace constructions, the interest in and the use of titanium and its alloys likewise has been increased. Although titanium, and titanium alloy, workpieces have the desired and needed characteristics of exceptional tensile strength and heat resistance, said workpieces are susceptible to atmospheric contamination during welding. Accordingly, in joining said workpieces by welding it is usual, and indeed necessary, either to weld the workpieces in a rigid chamber which has been purged of ambient air with and by the use of an inert gas, or to weld the workpieces in an area defined by shielding fixtures when a rigid chamber is not used. Each of the aforesaid techniques has inherent serious disadvantages. The use of the chamber requires an enormous waste of time and waste of the purging inert gas used. On the other hand, when a rigid purge chamber is not used, an almost endless array of shielding fixtures are required which, in turn, result also in a tremendous waste of time because the shielding array is not permanent, i.e., not reusable. This also results in shielding being an unduly expensive technique.

It is, therefore, readily apparent that what is needed in the art, and is not current available, is an apparatus which eliminates the aforementioned disadvantages, and which also permits the uncontaminated welding of titanium (and titanium alloy) workpieces and of other workpieces of other metals (and metal alloys) which are susceptible to atmospheric contamination during welding.

SUMMARY OF THE INVENTION

The instant invention permits the welding in an inert gas environment of workpieces of metal, and metal alloys, which are susceptible to atmospheric contamination during welding, without the use of either a rigid chamber or of shielding, inexpensively, quickly, and without any undue loss of the inert gas used in the welding environment, either for purging or for welding.

Accordingly, an object of this invention is to provide an inert gas environment in which can be welded metal workpieces made of materials which are susceptible to atmospheric contamination.

Another object of this invention is to provide the aforementioned inert gas environment without the prior art techniques of use either of a rigid chamber or of shielding.

Still another object of this invention is to provide an inert gas environment which is attained easily, quickly, inexpensively, and without undue loss of the inert gas used in creating the environment or in welding in that created environment.

A further object of this invention is to provide a collapsible, and reusable, inert gas environment welding chamber.

These objects of this invention, as well as other objects related thereto, will become readily apparent after a consideration of the description of the invention, together with reference to the contents of the Figures of the drawing.

DETAILED DESCRIPTION OF THE PREFERRED EMBODIMENT

Figure 1:
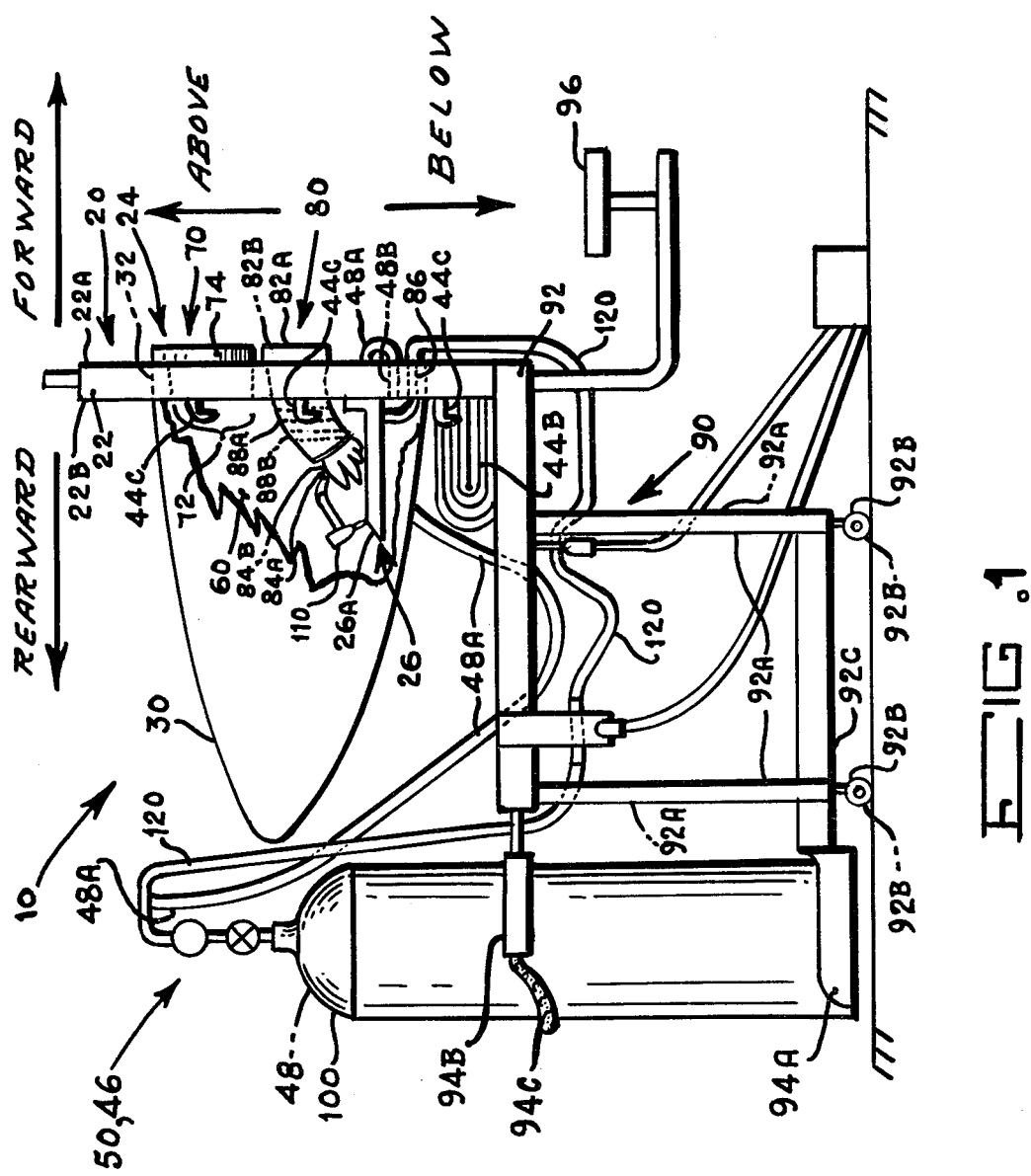
FIG. 1 is a side elevational view, in simplified pictorial and schematic form and partially fragmented, of a preferred embodiment of the invention.

With reference to FIG. 1, therein is shown a preferred embodiment 10 of the invention, i.e., a welding chamber assembly for welding workpieces in an air-free, inert-gas environment. In this regard it is to be remembered that the invention 10 is ideally suited for welding workpieces made of a metal which is susceptible to atmospheric contamination during welding, such as titanium and titanium alloys. Still with reference to FIG. 1, it is to be noted that directional designations (e.g., Rearward, Forward, Above and Below) are shown to better orient and assist the reader.

Figure 3:
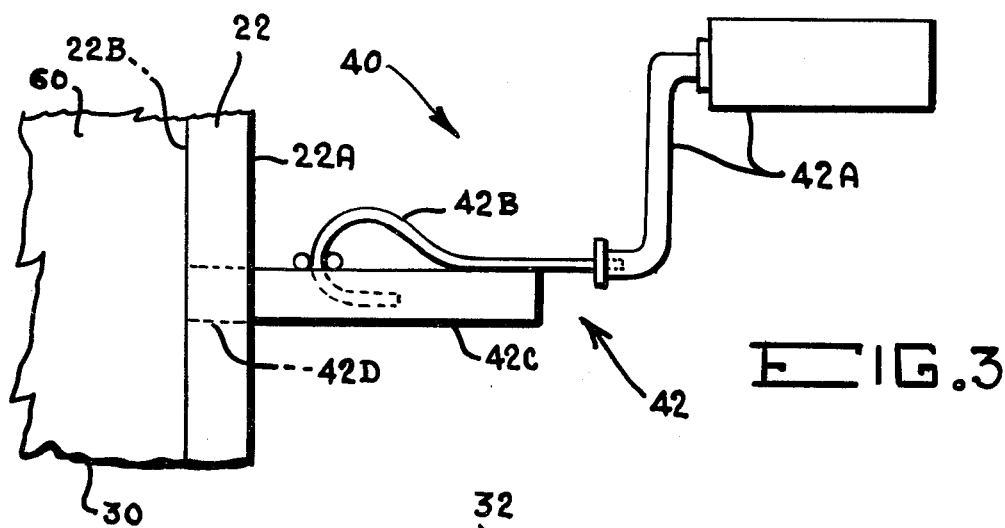
FIG. 3 is a side elevational view, in simplified pictorial and schematic form, and enlarged and not to scale, of a preferred means for evacuating air from the fluid-impervious welding chamber of the assembly.

With reference to FIGS. 1 and 3, the invention comprises, in the most basic and generic form, the following: a wall subassembly 20, FIG. 1, which preferably is positioned vertically; a collapsible member 30, FIG. 1, made of fluid-impervious material and connected to the wall subassembly 20, with this member 30 and the wall subassembly 20 defining a fluid-impervious welding chamber 60, FIG. 1; means (generally designated 40, FIGS. 3 and 4) associated with the fluid-impervious welding chamber 60, for evacuating air (i.e., the ambient atmosphere) from the chamber 60; and means (generally designated 50, FIG. 1), associated with the fluid-impervious welding chamber 60, for introducing inert gas into the welding chamber 60 to replace the air (i.e., the ambient atmosphere) which is evacuated from the chamber 60.

Figure 2:
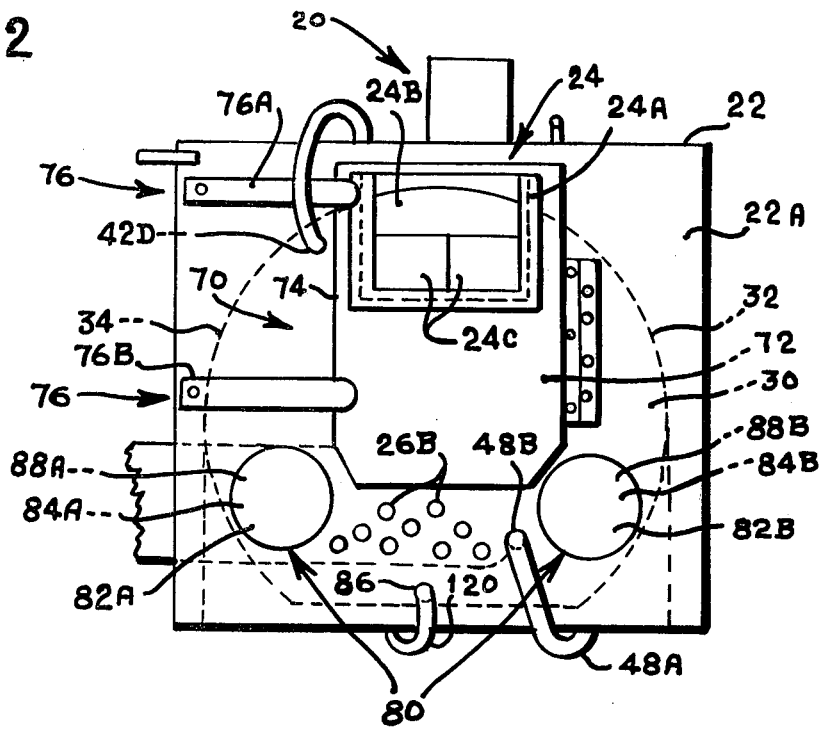
FIG. 2 is a front view, in simplified pictorial and schematic form, of a portion of the preferred embodiment of the invention.

More specifically, and with reference to FIGS. 1 and 2, the wall subassembly 20 comprises a rigid wall member 22 made of fluid-impervious material, preferably metal; means (generally designated 70), associated with the wall member 22, for selectively permitting the passage of workpieces and other items through the wall member 22; means (generally designated 24), made of fluid-impervious material, for seeing through the wall member 22, with this means 24 associated with the means 70 for selectively permitting the passage of workpieces and other items through the wall member 22; means (generally designated 80), associated with the wall member 22, for permitting the manipulation and the welding of the workpieces in the welding chamber 60; and means (generally designated 26) associated with the wall member 22, for supporting the workpieces and other items that are passed through the wall member 22.

Still with reference to FIGS. 1 and 2, the means 70 for selectively permitting the passage of workpieces and other items (such as tungsten electrodes, filler wire, and the like) through the wall member 22 includes: an opening 72 through the wall member 22; a door member 74 attached to an external surface 22A of the wall member 22 and selectively movable to cover, and to uncover, the opening 72; and, means (generally designated 76) for holding the door member 74 in a position covering the opening 72. As a matter of preference the means 76 includes an upper latch 76A, FIG. 2, and a lower latch 76B, FIG. 2.

The means 24, FIGS. 1 and 2, for seeing through the wall member 22 includes, as better seen in FIG. 2, an opening 24A through the door member 22 with a window 24B and a welding lens 24C in the opening 24A.

The means 80, FIGS. 1 and 2, for permitting the manipulation and the welding of the workpieces includes: at least two port holes (such as 82A and 82B, FIGS. 1 and 2) in the wall member 22; a glove (such as 84A and 84B, better seen in FIG. 1) made of fluid-impervious material (such as rubber) connected to each port hole 82A and 82B, with each glove 84A and 84B selectively positionable forwardly of, or rearwardly of (i.e., outside of), its respective port hole 82A or 82B in the wall member 22; and a hole 86 in the wall member 22 for a lead (such as 120, FIGS. 1 and 2) of welding torch 110, FIG. 1, with the hole 86 configurated, dimensioned, and sealed, such that it (the hole 86) is fluid-tight when the lead 120 is in the hole 86. It is to be noted that, as a matter of preference, between each glove 84A and 84B and its respective port hole 82A and 82B there is interposed a fluid-impervious sleeve 88A and 88B which interconnects each glove to its respective port hole.

The means 26 for supporting workpieces and other items (such as extra tungsten electrodes, filler wire, and the like) that are passed through the wall member 22 is a shelf 26A, better seen in FIG. 1, which is attached to a rear surface 22B of the wall member 22; which extends rearwardly therefrom; and which is disposed below the means 70 for permitting the passage of workpieces and of other items through the wall member 22. As a matter of preference, the shelf 26A is made of metal, and is fixedly attached to the rear surface 22B of the wall member 22 by suitable conventional fastening means, such as the rivets 26B, FIG. 2. Of course, the shelf 26A is within the collapsible member 30, FIG. 1, which, together with the wall member, defines the fluid-impervious welding chamber 60, FIG. 1. With regard to the collapsible member 30, it is to be noted that this member 30 preferably is a reusable plastic bag which is releasably attached to the rear surface 22B of the wall member 22. Preferably, the plastic bag 30 is made of polyethylene and is translucent, but need not be, and, also the bag 30 preferably is releasably attached to a flange 34, FIG. 4, on the rear surface 22B of the wall member 22 with a clamping band 32 (best shown in FIG. 4).

Figure 4:
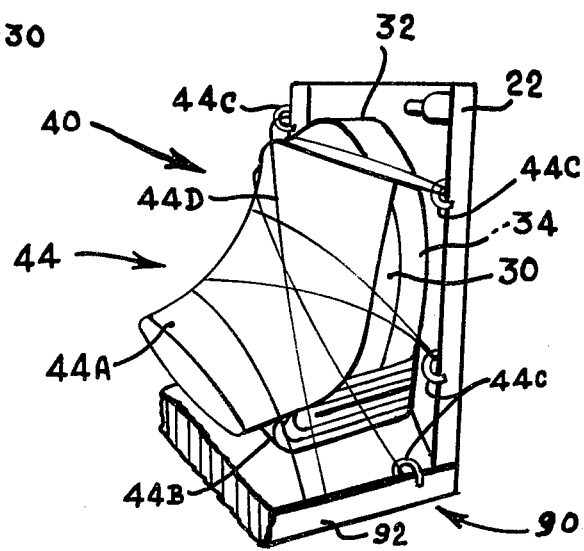
FIG. 4 is a perspective view, in simplified pictorial and schematic form, of the collapsible, fluid-impervious chamber bag component of the invention in a collapsed condition, while loaded down with padding and while it and the padding are releasably bound with a cord, during purging of ambient air from the bag by an inert gas.

With reference to FIGS. 3 and 4, therein is shown the means 40, associated with the fluid-impervious welding chamber 60, for evacuating air from the chamber 60. As can be seen from FIGS. 3 and 4, this means 40 includes: means (generally designated 42, FIG. 3) for attaining a partial vacuum which is in communication with the collapsible member 30, whereby this member 30 is thereby collapsed; means (generally designated 44, FIG. 4) for removably loading and releasably binding the collapsed member 30; and, means (generally designated 46, FIGS. 1 and 2) for purging any air remaining in the partially air-evacuated, removably loaded, and releasably bound, collapsed member 30, FIG. 4, with this means 46 including a source 48, FIG. 1, of inert gas in communication (by suitable conduit, such as 48A, FIGS. 1 and 2) with the collapsed member 30, FIG. 4, through opening 48B, FIGS. 1 and 2.

More specifically, the partial vacuum attaining means 42, FIG. 3, preferably comprises an air suction device 42A (such as an air operated vacuum cleaner or the like) to which an air fitting attachment 42B is connected, with the fitting 42B in communication with a tube 42C which, in turn, is in communication with an inlet 42D through the wall member 22 which, in its turn, is in communication with the member 30 of the chamber 60.

The means 44 (FIG. 4) for removably loading and releasably binding the collapsed member 30 preferably includes: padding (such as 44A, FIG. 4, and 44B, FIGS. 4 and 1) disposed on, and selectively around, the collapsed member 30; a plurality of hooks (all similarly designated 44C, FIGS. 4 and 1) fixedly attached to the wall member 22; and a cord 44D (or rope or the like, e.g., a "bungee" cord), FIG. 4, releasably engaged to the hooks 44C and disposed such as to criss-cross and be in contact with the padding 44A and the collapsed member 30.

It is here to be noted that the means 50, FIG. 1, for introducing inert gas into the welding chamber 60 (and, of course, into bag member 30) to replace the air which is evacuated from the chamber 60, and the means 46, FIGS. 1 and 2, for purging any air remaining in the partially air-evacuated, removably loaded, releasably bound, and collapsed member 30, FIG. 4, can be, and preferably are, one and the same means.

The inert gas used in means 50 and/or 46 can be any inert gas, but preferably is argon.

As a matter of preference and not of limitation, the welding chamber assembly 10 further comprises means (generally designated 90, FIGS. 1 and 4) for supporting the wall subassembly 20, the collapsible member 30, and the means 46, 50 for introducing inert gas (i.e., the argon) into the chamber 60. The support means 90, FIG. 1, includes a horizontal cart or table 92 preferably made of metal and having a plurality of legs (preferably four, such as are similarly designated 92A, FIG. 1), with each leg 92 having a castor 92B. The cart 92 also preferably has, but need not have, a lower tray 92C. It is this horizontal rollable cart 92 which directly supports the wall assembly 20 and the collapsible member 30; and as a matter of preference, the wall assembly 20 is fixedly connected to the top of the cart 92 by any suitable means, such as by welding.

The cart 92 indirectly supports the means 46, 50 for introducing inert gas into the chamber 60. Since the means 46, 50 includes a source 48 of inert gas (i.e., argon), that source 48 is preferably in the structural form of a conventional gas holding and dispensing cylinder. Accordingly, the cylinder 48 is supported at the bottom by a shelf 94A which is fixedly attached to the cart 92; and, the cylinder 48 is supported approximately at the vertical midpoint by an upper mount 94B in the form of a crescent-like member fixedly attached to the cart 92, with a securing chain or the like 94C surrounding the cylinder 48, and attached at each of its ends to the upper mount 94B. It is, therefore, accurate to state that the support means 90, FIG. 1, preferably further includes the aforementioned bottom shelf support 94A, an upper mount 94B, and a chain member 94C.

It is here to be noted that, as a matter of convenience, efficiency, and preference, the support means 90 also further includes a: seat 96 (affixed to the cart 92, FIG. 1) for comfortable use by an operator (not shown); and a support for the source 100 of inert gas which is to be used in welding. The welding gas source 100 is also in the form of a conventional gas holding and dispensing cylinder. The cylinder 100, FIG. 1, preferably contains argon; and, as was the situation with cylinder 48, FIG. 1, cylinder 100 is supported, held, and secured by bottom shelf 94A, upper mount 94B, and securing chain member 94C. It is here also to be noted that, although the view of cylinder 48 in FIG. 1 is obscured by the cylinder 100 which is aligned with cylinder 48, another Figure of the drawing (solely for the purpose of readily showing that cylinders 48 and 100 are aligned) is not deemed necessary. It is here further to be noted that the welding torch 110, FIG. 1, is interconnected to argon gas source cylinder 100 by conduit 120.

MANNER OF OPERATION AND OF USE OF THE PREFERRED EMBODIMENT

The manner of operation (i.e., function), and of use, of the preferred embodiment 10 of the invention can be easily ascertained by any person of ordinary skill in the art from the foregoing description, coupled with reference to the contents of the Figures of the drawing, particularly FIG. 1.

For others, the following simplified explanation is given. Assuming that workpieces made of a metal which is susceptible to atmospheric contamination (e.g., titanium or titanium alloy workpieces) during welding are, in fact, to be welded, and that the instant invention 10 is to be used to accomplish that welding, then the following steps are performed in sequence: (a) installing a collapsible member 30, e.g., a plastic bag, so that a welding chamber 60 (in a collapsed condition) is formed; (b) loading the collapsed chamber 60 with the workpieces to be welded and with all other items needed to accomplish the welding; (c) preparing the collapsed and loaded chamber 60 for purging of the air therein with an inert gas, i.e., argon; (d) purging the collapsed and loaded chamber 60 (or, more precisely, the bag member 30) of air; (e) testing the inert gas environment in the chamber 60,; and (f) performing the necessary welding in the chamber 60.

More specifically, the collapsible member 30 is installed by slipping its open end over the mounting flange 34 on the rearward surface 22A of the wall member 22, and securing the collapsed bag member to that flange 34 with a clamping band 32. It is to be noted that this bag member 30 is reusable. The installation of this bag member 30 results in the defining and forming of a welding chamber 60.

The collapsed chamber 60 (or bag member 30) is "loaded" (i.e., filled) with the workpieces to be welded and other items (e.g., extra tungsten electrodes, several pieces of filler wire, and a test piece of titanium or titanium alloy), by passing them through the opening 72 in the wall member 22, and by placing them on the shelf 26A which is within the welding chamber 60 (and the bag member 30). It is here to be noted and remembered that the welding torch 110 and the gloves 84A and 84B and their respective sleeves 88A and 88B are already on the rearward side of the wall member 22, and are enclosed within the welding chamber 60 (and the bag member 30) by virtue of the installation of the bag member 30.

The collapsed and loaded chamber 60 (or the bag member 30) is prepared for the purging of the ambient air in it by: closing the door member 74; securing the two door latches 76A and 76B; checking to see that the argon purge supply hose 48A is in the purge (lower) hole 48B in wall member 22; drawing a partial vacuum through the purge (upper) hole 42D in wall member 22 by use of the air suction means 42 (as shown in FIG. 3) until the bag member 30 is drawn tightly against all surfaces of items within the bag 30; removing the means 42 and quickly closing hole 42D with any suitable means, such as tape; padding the entire outside of bag member 30 (as shown in FIG. 4); and tieing down the padding 44A and 44B and the bag member 30 with the use of the "bungee" cord 44D and the hooks 44C.

Purging of the loaded and collapsed chamber 60, and of the padded, bound, and collapsed bag member 30, is accomplished by: turning on the purge argon cylinder 48; opening the hole or vent 42D, removing the resultant argon-remainder air mixture with the use of air suction means 42, and closing the vent 42D); removing the "bungee" cord 44D and the padding 44A; allowing the bag member 30 to fully inflate; and, turning off the flow of argon from the purge argon cylinder 48.

The inert gas environment in the chamber 60 (or in the bag member 30) is tested by an operator (not shown) who sits on seat 96, facing the forward surface 22A of the wall member 20, and whose bands are in the gloves 84A and 84B and whose forearms are in the sleeves 88A and 88B which are within the bag 20 and the chamber 60. The testing comprises the operator welding a short bead on the previously mentioned clean piece of scrap titanium, and inspecting the bead. If the bead is satisfactory, the necessary welding of the workpieces is accomplished. In the unlikely event that the bead is unsatisfactory, the chamber 60 and the bag 30 are simply further purged; and, a test weld on the scrap titanium is again made for testing purposes. This procedure is repeated until a satisfactory (i.e., uncontaminated) weld is attained on the scrap titanium. Then, of course, the actual necessary welding of the workpieces is performed. Here it is to be noted that the manipulation of the welding torch 110, the test piece (not shown), the workpieces (not shown), and of anything else within the chamber 60 (and bag 30) is performed by the operator whose hands are in the gloves 84A and 84b. The operator views, while welding, through welding lens 24C; and, inspects the work done through window 24B, through which window 24B the operator may look into the chamber 60 and bag 30 also at other times, as desired or necessary.

CONCLUSION

It is abundantly clear from all the foregoing, and from the contents of the Figures of the drawing, that the stated objects of the invention 10, as well as objects related thereto, have been achieved.

It is to be noted that, although there have been described and shown the fundamental and unique features of the invention 10 as applied to a preferred embodiment, various other embodiments, variations, adaptations, substitutions, additions, omissions, and the like may occur to, and can be made by, those of ordinary skill in the art. For example, the rearwardly disposed lens 92A of the horizontal cart 92, FIG. 1, may be made shorter than the forwardly disposed legs of the cart, such that the cart 92 has a slant, inclination, pitch or the like to the left of the reader. In some circumstances, such a pitch may make a particular operator more comfortable. If, in fact, the cart 92 is pitched rearwardly, it has been found that the wall member 22 need not be maintained vertical to the ground, but rather than the wall member 22 is better useable also in a pitched condition, i.e., vertical to the pitched top of the cart 92.

What is claimed is:

1. A welding chamber assembly for welding workpieces, made of a metal which is susceptible to atmospheric contamination during welding, in an air-free, inert gas environment, said welding chamber assembly comprising:
   a. a wall subassembly which includes:
      a rigid wall member made of metal;
      means, associated with said wall member, for selectively permitting the passage of workpieces and other items through said wall member, wherein this means includes: an opening through said wall member; a door member attached to an external surface of said wall member and selectively movable to cover, and to uncover, said opening; and means for releasably holding said door member in a position covering said opening;
      means, made of fluid-impervious material, for seeing through said wall member, with this means associated with said means for selectively permitting the passage of workpieces and other items through said wall member, wherein said means for seeing through said wall member includes an opening through said door member with a window and a welding lens in said opening;
      means, associated with said wall member, for permitting manipulation and welding of said workpieces, wherein this means includes: at least two port holes in said wall member; a glove made of fluid-impervious material connected to each said port hole, with each glove selectively positionable forwardly of, or rearwardly of, said wall member; and a hole in said wall member for a lead of a welding torch, with said hole configurated, dimensioned, and sealed, such that it is fluid-tight when said lead is in said hole; and
      means, associated with said wall member, for supporting said workpieces and other items passed through said wall member, wherein this support means includes a metal shelf which is attached to a rear surface of said wall member, which extends rearwardly therefrom, and which is disposed below said means for permitting the passage of workpieces and other items through said wall member;
   b. a collapsible member, which comprises a translucent reusable bag made of fluid-impervious material, releasably attached to a flange located on the rear surface of said wall member, with said collapsible member and said wall subassembly defining a fluid-impervious welding chamber which houses said means for supporting said workpieces and other items passed through said wall member and which also houses said means for permitting manipulation and welding of said workpieces;
   c. means, associated with said fluid-impervious welding chamber, wherein this means includes: means, including an air suction device, for attaining a partial vacuum in communication with said collapsible member, whereby said member is thereby collapsed; means for removably loading and releasably binding said collapsed member, wherein this means includes: padding disposed on, and selectively around, said collapsed member; a plurality of hooks fixedly attached to said wall member, and a cord releasably engaged to said hooks and disposed such as to criss-cross and be in contact with said padding and said collapsed member; and means for purging any air remaining in said partially air-evacuated, removably loaded, and releasably bound, collapsed member, wherein this air purging means includes a source of inert purging gas in communication with said collapsed member;
   d. means, associated with said fluid-impervious welding chamber, for introducing inert gas into said chamber to replace said air evacuated from said chamber; and
   e. means for supporting said wall subassembly, said collapsed member, said means for introducing inert gas into said chamber, and a source of inert gas for use in welding.

2. A welding chamber, as set forth in claim 1, wherein said means for introducing inert gas into said chamber to replace said air evacuated from said chamber, and said means for purging any air remaining in said partially air-evacuated, removably loaded, and releasably bound, collapsed member, are one and the same means.

3. A welding chamber, as set forth in claim 2, wherein said inert gas is argon.

4. A welding chamber assembly, as set forth in claim 1, wherein said workpiece metal is made of titanium.

5. A welding chamber assembly, as set forth in claim 1, wherein said workpiece metal is made of a titanium alloy.

6. A welding chamber assembly, as set forth in claim 1, wherein said collapsible member is a plastic bag made of polyethylene.

* * * * *